United States Patent [19]

Kieffer

[11] 4,357,968

[45] Nov. 9, 1982

[54] METHOD AND APPARATUS FOR FORMING MULTI-POLE WINDINGS

[75] Inventor: Vernon E. Kieffer, St. Louis, Mo.

[73] Assignee: Emerson Electric Co., St. Louis, Mo.

[21] Appl. No.: 222,833

[22] Filed: Jan. 6, 1981

[51] Int. Cl.³ .............................................. B21F 3/00
[52] U.S. Cl. .................................... 140/92.1; 29/736; 72/382
[58] Field of Search ................ 140/92.1, 92.2; 29/564, 29/596, 736; 72/383, 382

[56] References Cited

U.S. PATENT DOCUMENTS

| | | | |
|---|---|---|---|
| 1,833,010 | 11/1931 | Willy | 140/92.2 |
| 1,984,721 | 12/1934 | Beitling | 140/92.2 |
| 2,174,839 | 10/1939 | Riddle | 140/92.2 |

Primary Examiner—Lowell A. Larson
Attorney, Agent, or Firm—Polster, Polster and Lucchesi

[57] ABSTRACT

Method and apparatus for forming a multi-pole winding for a dynamo-electric machine wherein a skein of magnet wire is wound and mounted on spaced retaining jaws biased outwardly to keep the wire under light tension during a subsequent forming process. Forming tools are moved inwardly against the wire between the retaining jaws to produce a petalled, serpentine form with a series of apices between the retaining jaws. Holding pins are inserted between the wire and the forming tools at the apices, and the forming tools are retracted. While the wire is held between the retaining jaws and holding pins, it is loaded onto a fingered transfer tool.

18 Claims, 14 Drawing Figures

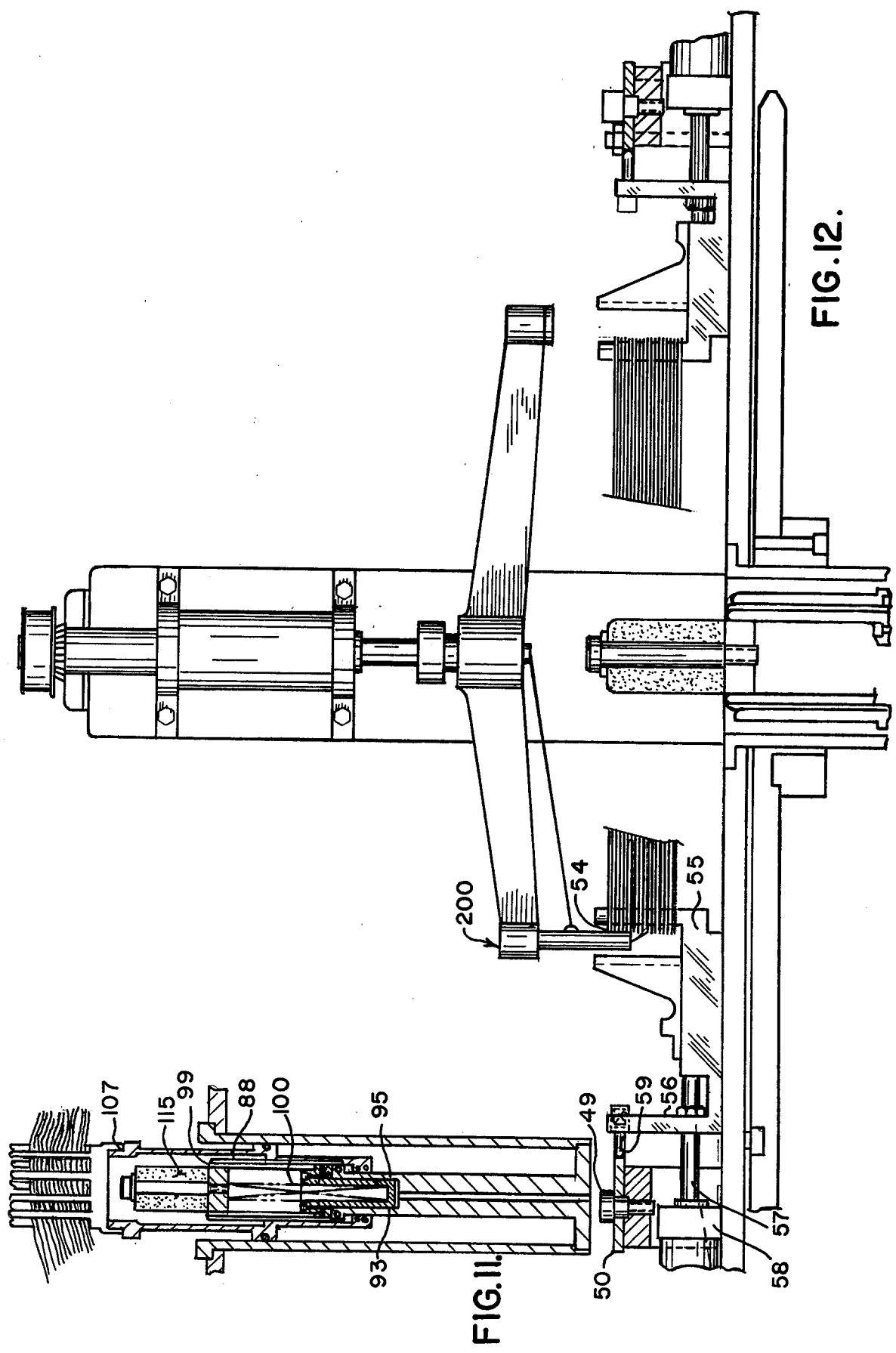

METHOD AND APPARATUS FOR FORMING MULTI-POLE WINDINGS

BACKGROUND OF THE INVENTION

This invention is described as applied to an 18-pole ceiling fan motor because that motor presents the problems solved by the present invention in particularly concrete form to those skilled in the art, but the invention has application to other dynamo-electric machines as well.

In producing multi-pole motors, particularly eighteen pole multi-speed reversible ceiling fan motors with low current draw, for example 100 watts at 100 v., there are many problems related to the loading of the stator coils into the stator slots and the fineness of the wire used (e.g., No. 31 wire) in commercial practice. Conventionally, individual coils are wound and loaded onto a transfer tool or directly onto an axial coil injection machine. This is labor intensive and expensive. There are available machines, primarily developed for the European washing machine motor in which the stator is constructed with a high polarity section of either 12, 16 or 18 poles, in which a large circular skein coil is formed into a wave pattern and transferred directly into inserter tooling. Machines of this sort are produced by Essex Machinery & Terminals Division of United Technologies International. Such a machine is described in Appliance Manufacture, October, 1978, under the title "A 'Winding' Path into Italian Territory." These machines, though excellent, are very complex and expensive.

One of the objects of this invention is to provide a coil forming machine and method, using a skein winding technique, by which at least as many stators can be produced per shift as by machines and methods known heretofore, at several orders of magnitude less cost.

Another object is to provide such a machine that is simple, rugged, easy to use and dependable.

Other objects will become apparent to those skilled in the art in the light of the following description and accompanying drawing.

SUMMARY OF THE INVENTION

In accordance with this invention, generally stated, a method of winding a multi-pole stator is provided which includes forming a skein of a multiplicity of turns of magnet wire, engaging the inner reaches of the skein with retaining jaws spaced from one another, moving forming tools simultaneously inwardly against the outer reach of the skeined wire between the retaining jaws while the retaining jaws are moved inwardly sufficiently to accommodate the effective shortening of the wire reaches, to produce a petalled, serpentine coil form with a series of inwardly directed apices between the retaining jaws, inserting a holding pin between the outer reach of the wire at the apices and the forming tools, retracting the forming tools, and, while the wire is held between the pins and the retaining jaws, loading the formed wire onto a transfer tool.

Apparatus for performing the method includes a table having a hole through it, a multiplicity of retaining jaws mounted on the table in spaced relation to one another for movement toward and away from the hole, forming tools mounted on the table between the retaining jaws for movement toward and to an inner position within the compass of a projection of the hole and away from the inner position to an outer position outboard of reaches of a skein of magnet wire extending between the retaining jaws, each of the tools having a nose portion with a surface defining a recess opening toward the hole, pins extending parallel to the recess-defining surfaces of the forming tools and mounted for reciprocating movement through the hole in the table to a position in which they lie within the reach of the recess-defining surfaces and a second position at which they are clear of those surfaces, and a transfer tool elevator for reciprocatingly carrying a transfer tool, parallel to and outboard of the pins from a position at which the fingers of the tool are clear of reaches of a coil of wire held by the pins to a position at which the fingers project through and beyond the reaches of those coils.

BRIEF DESCRIPTION OF THE DRAWINGS

In the drawing,

FIG. 11 is a fragmentary sectional view through the center of the coil forming machine, at a subsequent stage in its operation;

FIG. 12 is a fragmentary view, partly in section, showing another embodiment of skein winder used with the machine of FIG. 4;

DESCRIPTION OF THE PREFERRED EMBODIMENT

Figure 1:
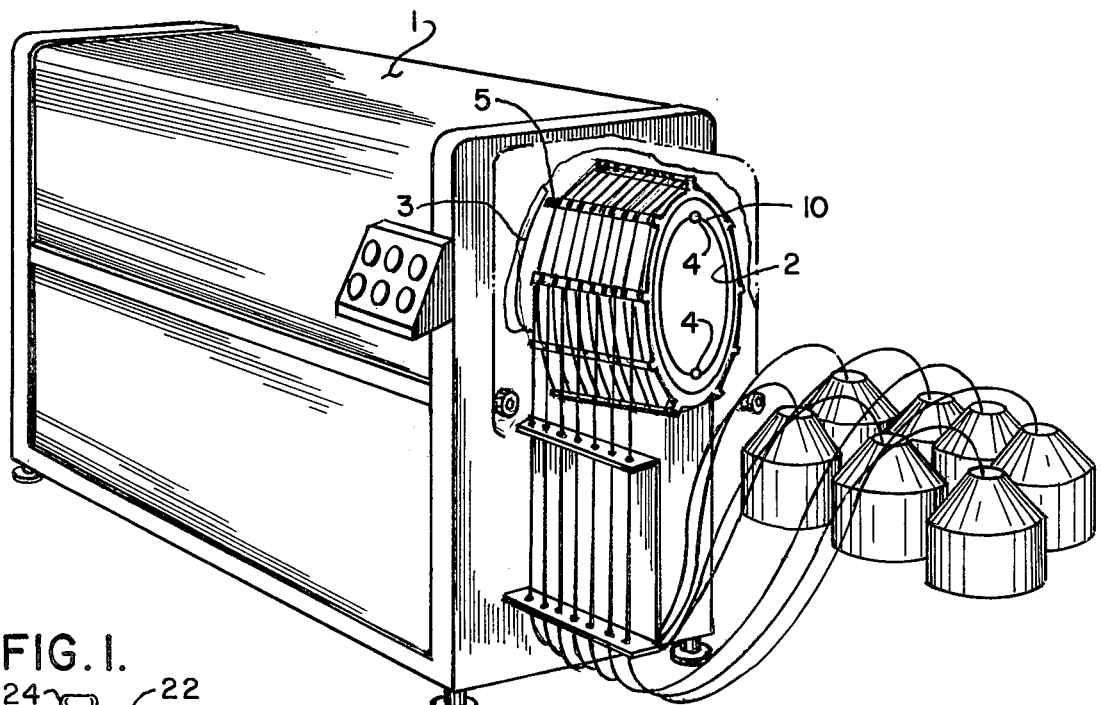
FIG. 1 is a view in perspective of a skein winding machine.
Figure 13:
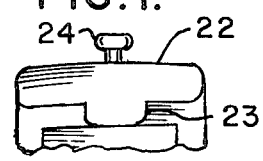
FIG. 13 is a fragmentary elevational view in the direction indicated at 13—13 of FIG. 3.
Figure 2:
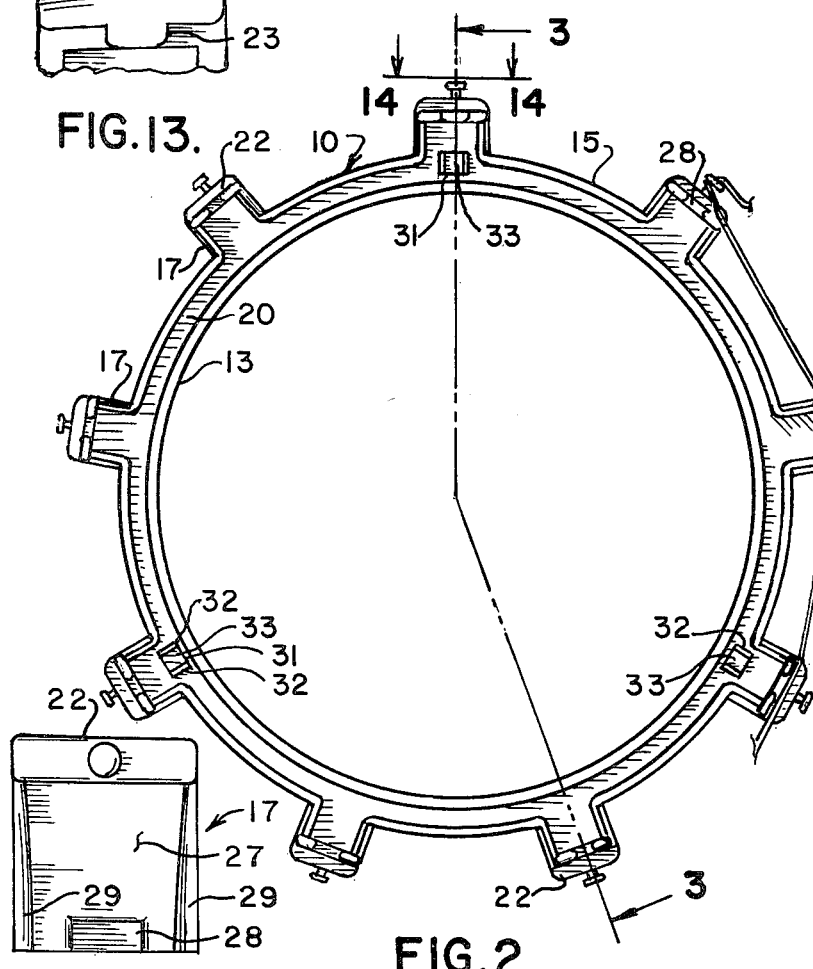
FIG. 2 is a plan view of coil winding form of this invention.
Figure 3:
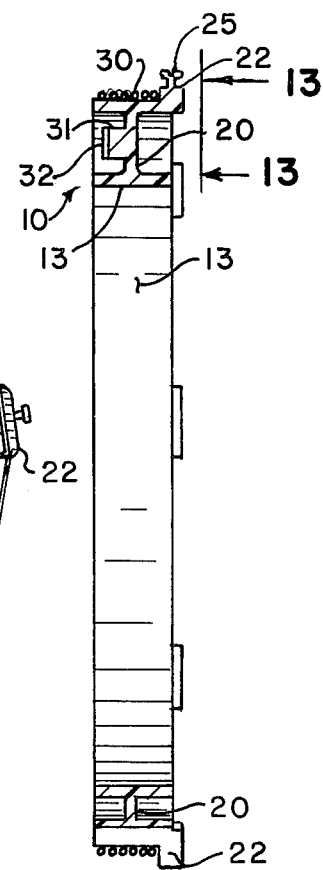
FIG. 3 is a sectional view, taken along the line 3—3 of FIG. 2.
Figure 14:
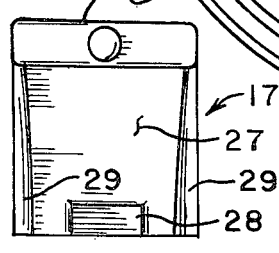
FIG. 14 is an elevational view in the direction indicated at 14—14 of FIG. 2.
Figure 4:
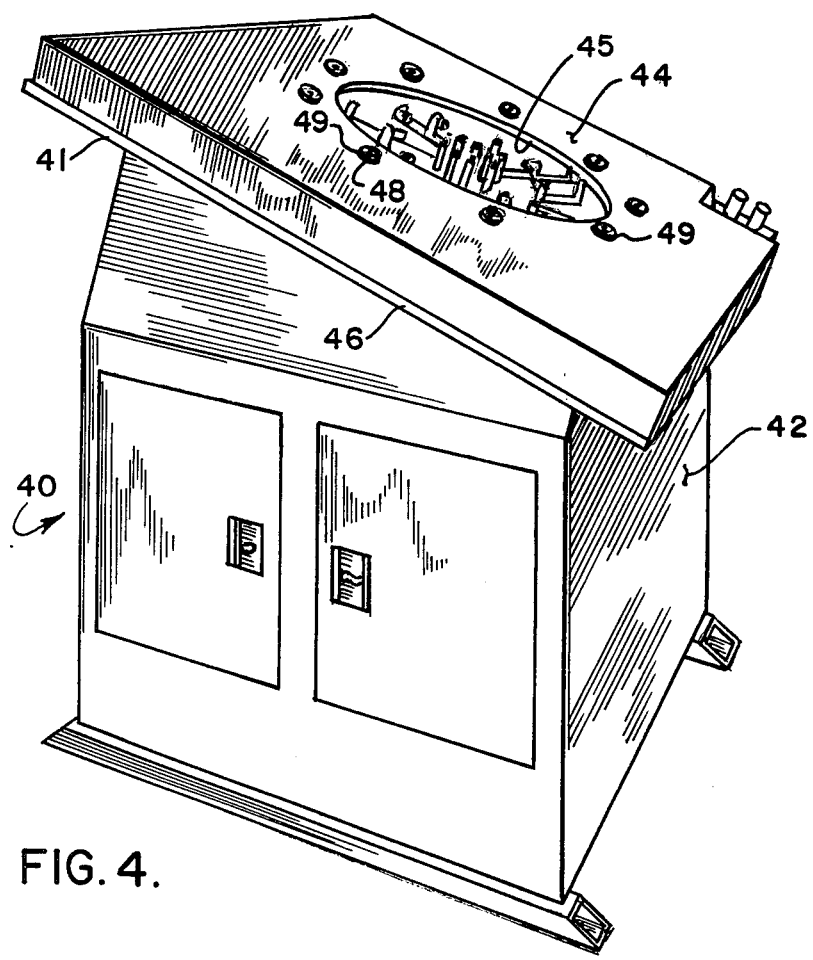
FIG. 4 is a view in perspective of a forming machine of this invention.
Figure 5:
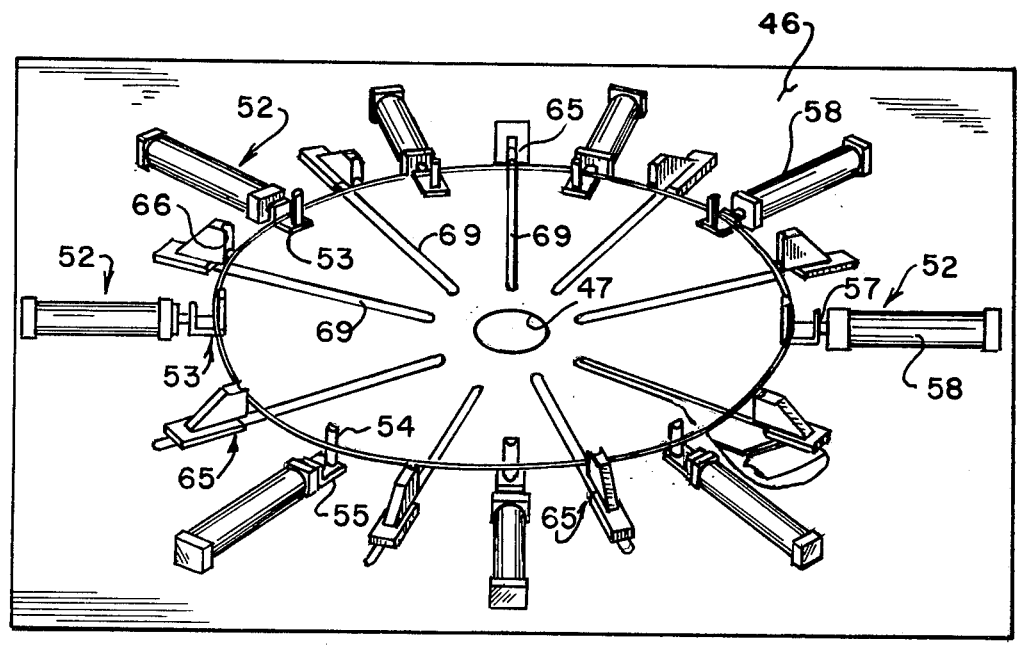
FIG. 5 is a somewhat diagrammatic view in perspective, showing retaining jaw and forming tool assemblies of this invention mounted on a table plate of the machine of FIG. 4.

Referring to the drawing, and particularly to FIGS. 1-3, reference numeral 1 indicates a skein winder, with a mandrel 2. A circular plate 3 at the machine end of the mandrel is driven by the same motor shaft, not here shown, as the mandrel. Axially projecting keys 5 serve to drive winding forms 10, which are mounted on the mandrel when a skein is being wound. Keepers 4, shown somewhat diagrammatically, prevent accidental dislodgment of the winding forms 10 during the winding process. The wire feed system and the mandrel driving and control systems of the winder 1 are conventional, and form no part of this invention.

Each of the winding forms 10 is in the form of an annulus, H-shaped in section, as shown particularly in FIG. 3, with an inner cylindrical uninterrupted surface 13 and an outer cylindrical surface 15 interrupted, in this embodiment, by nine symmetrically spaced radially outwardly projecting box-piers 17. The walls defining the inner and outer surfaces of the annulus are joined by a central web 20. In the illustrative embodiment of winding form shown, each of the piers 17 has along one outside edge a shoulder 22 from which a key 23 projects radially inwardly and a stud 24 projects radially outwardly. The stud 24 has a head on it, across which a slot 25 extends diametrically in a circumferential direction. Each of the piers 17 has a circumferential wall defining an outer surface 27 that has a slight draft in the direction away from the shoulder 22, for example, 2°, flanked by rounded pilasters 29 which, in this embodiment, have no draft. In the edge of the surface 27 opposite the shoulder 22 is a notch 28 which serves as a key seat to receive keys 23 of a contiguous winding form, and, in the form immediately contiguous the plate 3 when the forms are mounted on the mandrel 2, to receive the drive keys 5 on the plate 3. In the embodiment shown, three blocks 31, each with a surface 33 flanked by parallel ribs 32, are integral with a surface of the web 20 on the opposite side from the shoulder 22. The surface 33 of the blocks 31 is in the same plane as the circumferentially extending notch-defining surface. In one embodiment, a strip of flexible mylar or the like, is mounted on the surface 33 and projects across the parallel surface of the notch to project a short distance radially outwardly of the notch, to ensure that wire skein 30 does not strip accidentally from the winding form. However, in the preferred embodiment, in which the pilasters 29 have no draft, such an arrangement has been found to be unnecessary with the wire presently being used commercially.

Referring now to FIGS. 4 through 11, and, for certain of the details of the machine, to FIG. 12, reference numeral 40 indicates a wire forming machine with a table 41 supported by a base housing 42. The table includes a cover 44 with a large circular opening 45, and, spaced from the cover, a table plate 46 with a circular hole 47 through it. In the embodiment shown in FIG. 4, the table plate 46 is mounted on a slant to facilitate loading and unloading by an operator.

Nine small openings 48 in the cover 44, symmetrically arranged around the circular opening 45, permit cam setting knobs 49 to project above the surface of the cover. The cam setting knobs 49 are connected to stop cams 50 mounted to permit their rotation by cam setting knobs 49, on the table plate 46, as indicated particularly in FIG. 12.

Nine retaining jaw assemblies 52 are arranged symmetrically about the circular hole 47 in the table plate 46. Each of the retaining jaw assemblies 52 includes a jaw 53 that has an upstanding wire-engaging member 54, convex surfaced on the side away from the hole 47, carried by a plate 55 which in this embodiment is integral with a riser stop 56. A spring-loaded plunger is mounted in the riser stop to project from the riser stop in a direction away from the member 54. A piston rod 57 is connected to the riser stop 56, and is mounted to be moved reciprocatingly by a double-acting pneumatic cylinder 58 mounted on the upper surface of the table plate 46.

Forming tools 65 are mounted symmetrically between the retaining jaw assemblies 52, and, in this embodiment, between gibs 72. Each of the forming tools 65 has a nose member 66 with a surface defining a pin-receiving recess 67 perpendicular to the upper surface of the table plate 46 and opening toward the circular hole 47. Radially extending slots 69 in the table plate 46 serve as guides for the nose members 66, each of which has a cam follower 68 extending perpendicularly to the table plate through a slot 69 and into a scroll plate cam slot 70 in a scroll plate 71.

The scroll plate 71 is mounted below the table plate 46 for rotation about the central axis of the hole 47, and is driven by a double-acting pneumatic cylinder and crank, whereby the forming tools are moved by the camming surfaces of the scroll plate slots and the surfaces of the radial slots 69 simultaneously and synchronously toward and away from the hole 47 when the scroll plate is rotated. The nose of the forming tool extends beyond the cam follower in the direction of the hole 47 sufficiently far to permit the leading end of the nose to project well within the compass of a projection of the hole 47 when the nose is moved to its radially innermost position.

The hole 47 is defined by a stepped boss, providing an annular seat 80 in which a flange 87 integral with the upper end of a cylinder 86 seats. The cylinder 86 is a pneumatic cylinder which, in this embodiment, is shown as being a single-acting cylinder, with a single fitting 112 through which air is introduced to and exhausted from the cylinder. However, the cylinder 86 can be, and preferably is, a double-acting cylinder, but these are conventional arrangements, and, as such, form no part of this invention.

A core column 90 with a radially outward extending closure flange 91 at its bottom end, extends through a part of the height of the cylinder 86. The core column 90 has an outwardly radially extending annular packing gland 92 at its upper end, and a well 93 opening through the upper end of the core column at its upper end, and opening at its lower end into an air passage 94 through which compressed air is admitted and exhausted. An extension cylinder 88 is mounted on and around the packing gland 92, and projects upwardly toward and partly within the compass of the boss defining the hole 47, within the cylinder 86.

In this embodiment a fixed spider 101 is mounted within the upper end of the cylinder 88. Between the fixed spider 101 and the core column 90 is a piston made up of a piston collar 96 with an annular O-ring seat 97 and, in air-tight relation, a piston spring cup 95, in which a spring 100 is seated at one end. The spring 100 bears at its other end on the underside of the fixed spider 101. The cup 95 is of a size to fit within the well 93, as shown more particularly in FIG. 11.

Retaining pins 99 positioned in coincidental alignment with the recesses 67 in the noses of the forming tools 65 are mounted at their lower ends on and to project upwardly from an upper surface of the collar 96.

Also reciprocatingly mounted within the cylinder 86 is a transfer tool elevator mechanism 102. In this embodiment, the transfer tool elevator mechanism includes a hollow piston 103 with an inwardly projecting annular gland 104 at its bottom and an outwardly projecting annular gland 105 spaced above the gland 104 and below an annular platform 106. The gland 104 forms a sliding seal with the outer surface of the core column 90, and the seal 105, with the inner surface of the cylinder 86. The platform 106 slidably embraces the extension cylinder 88. The platform 106 is radially inwardly stepped on its upper side to provide an annular seat 107 for transfer tools 120.

A capped shaft 116 is threaded at its lower end into a threaded hole in the center of the spider 101. The shaft 116 serves as a mount for a cylindrical rubber block or, preferably, for a soft bristle brush, 115.

The transfer tools 120 are of the general type illustrated and described in U.S. Pat. No. 3,714,973, with fingers 121 defining between them wire-receiving slots. In this embodiment, the eighteen pole stator to be wound permits the use of eighteen identical, equispaced fingers. The fingers at their lower ends are integral with an annular base rim 122, in which locating channels are formed. The transfer tools can be made of any desired material, but a slick plastic has been found eminently suitable. As will be explained in more detail hereinafter, the tools 120 receive formed wire coils 125 near their apices 126. As with the transfer tools themselves, the winding forms 10 can be stacked in their loaded condition, for inventory. In this way, there need be no interruption of the operation of the forming machine during normal down time of the winder for reloading of the wire supply or maintenance.

Figure 9:
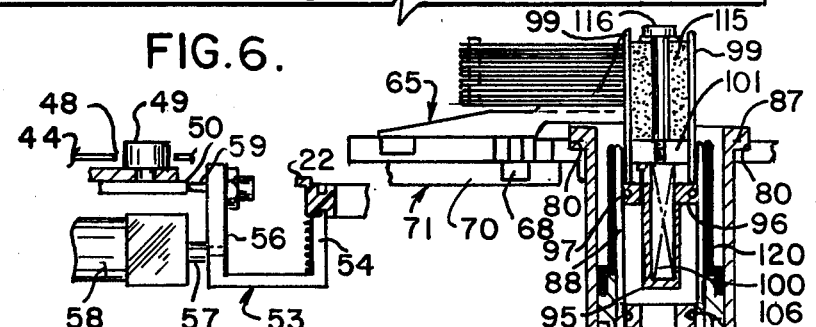
FIG. 9 is a fragmentary view, partly in section, of a retaining jaw in the process of being loaded from a coil form.

In operation, a plurality of winding forms 10, each oriented in the same direction, is mounted on the mandrel 2 of the winder 1. In the illustrative embodiment shown, seven of the winding forms are shown as mounted at the same time. The keys 5 on the circular plate 3 seat in key seat notches 28 in the winding form closest to the plate 3. Each of the keys 23 of the six winding forms intermediate the outer one and the plate 3, seats in a notch 28 of the immediately contiguous winding form. The keepers 4 are swung into position to hold the winding forms on the mandrel. A free end of a strand of wire is laid in the slot 25 of a stud of each form in the most convenient position (albeit the same position on all of the forms mounted on the mandrel for winding), and given a turn around the neck of the stud. The plate 3 and mandrel 2 are then rotated the desired number of times to provide a skein on each winding form with the proper number of turns, for example one hundred and eighty-five. Because the wire being wound is under a small but appreciable amount of tension, the skein 30 will be nonagonal, with substantially straight reaches between adjacent pilasters, as shown particularly but fragmentarily in FIG. 2. The programming by which the mandrel is brought up to speed, rotates through the desired number of turns and slows to a stop will be apparent to those skilled in the art and forms no part of this invention. The wire is then severed to permit the winding forms to be removed when the keepers 4 are moved out of the way. A winding form, with the skein on it, is then brought to the coil forming machine 40, inverted so that the shoulders 22 are uppermost, and placed over the upper end of the convex surface of the wire-engaging members 54 in such a way that the pilasters 29 are substantially aligned with the surface to permit the skein 30 to be slipped from the wire form onto the retaining jaws. The end of the wire that has been wrapped around the stud is released, and the wire is slid onto the member 54, as shown in FIG. 9.

The jaws 53 have been positioned to receive the skein 30 of a particular diameter by setting the cam stops 50 at the desired position and moving the retaining jaws away from the hole 47 until the outer surface of the riser stop 56 of each jaw engages the cam stop. A transfer tool 120 is seated, properly oriented by locating means on the annular rim 122, in the seat 107. The piston collar 96 and the transfer tool elevating platform 106 are in the lowermost position, so that both the form 120 and the pins 99 are below the level of the upper surface of the cylinder flange 87.

Figure 10:
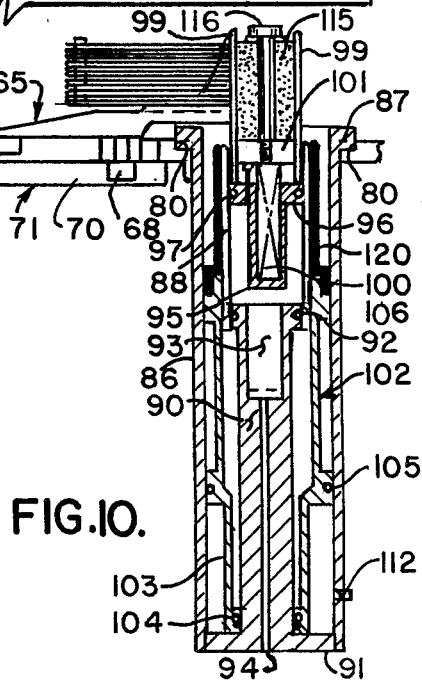
FIG. 10 is a fragmentary sectional view through the center of the coil forming machine, at one stage in its operation.

In this embodiment, compressed air under high pressure (e.g. 80 p.s.i.), is admitted to the cylinder 58 on the side of a piston to which a piston rod 57 is connected to move the rod and jaws radially outwardly against the bias of the spring plunger 59 to take out any slack in the skein. The scroll plate 71 is then rotated to drive the forming tools 65 radially inwardly. As the nose members 66 of the forming tools reach the skein, the air pressure in the cylinders 58 is reduced to a low pressure, for example 15 p.s.i., to provide a continuous but low grade radially outward bias on the skein. The nose members 66 of the forming tools engage the center of flat spans of the skein between the retaining members 54, and move the wire radially inwardly to a position within the compass of a projection of the hole 47, until the surface defining the recess 67 at each nose member is positioned to receive a pin 99 within the recess, as shown in FIG. 10. In this position, the inmost surfaces of the wires at the apices formed by the nose members are in gentle contact with the block or brush 115.

While the nose members are in that position, compressed air is admitted to the air passage 94, causing the piston collar 96 to rise, against the bias of the spring 100, forcing the pins 99 to move axially through the space between the apices of the now-formed petalled serpentine coil 125 and the surface 67.

Figure 6:
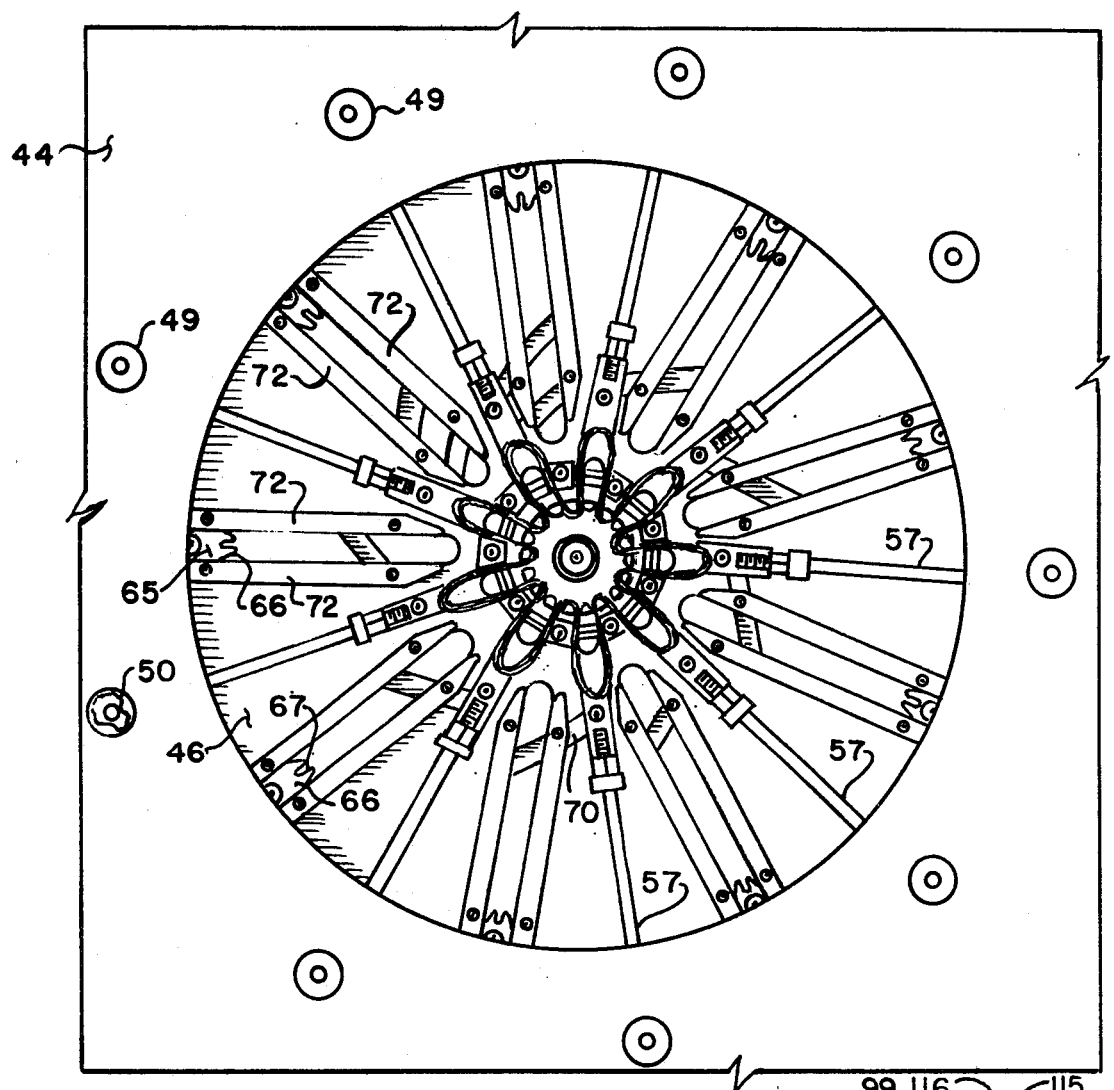
FIG. 6 is a top plan view of the machine of FIG. 4 at one stage of its operation.
Figure 7:
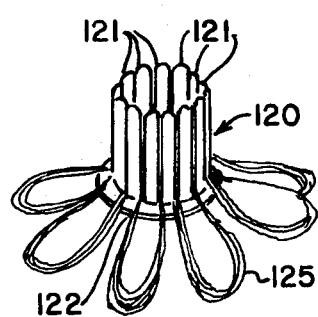
FIG. 7 is a view in perspective of a transfer tool loaded with formed coils, after removal from the machine following the stage of operation of the machine shown in FIG. 6.
Figure 8:
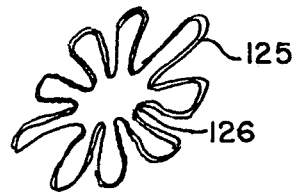
FIG. 8 is a view in perspective of a formed coil.

The forming tools are then retracted to the position shown in FIG. 6, by rotating the scroll plate in the opposite direction, but the bias of the retaining jaws is maintained. Compressed air is now admitted through fitting 112 to cause the piston 103 to move upwardly, elevating the transfer tool, moving the fingers 121, immediately radially outboard of the pins 99, so that the formed wire in each reach of the coil 125 moves into a slot between adjacent fingers, as shown in FIGS. 7 and 11. The air in the core and extension cylinder 88 is then exhausted, permitting the spring 100 to move the pins 99 down to the position shown in FIG. 11. The retaining jaws are moved radially inwardly, by switching the inlet and exhaust ports of the cylinder 58, to release the coil, and the coil form elevating piston is moved up to clear the block or brush 115 and to permit ready removal of the loaded transfer tool, as shown in FIG. 11, and mounting of an unloaded transfer tool.

By using a separate winder, skeins can be wound during the time coils are being formed on the coil forming machine. In the embodiment of machine shown in FIG. 12, a coil winding needle 200 is shown as being mounted to wind skeins directly on the convex surface wire-engaging members of the retaining jaws. The advantage of such a machine is that it eliminates the need for a separate winder and for supplying and transporting winding forms. Its disadvantage is that the forming mechanism can not be used while the skein winder is operating.

The forming of the skein polygonally is important to the operation of the forming machine, because if the skein is formed as a circle, when the forming tools are moved radially inwardly, their initial movement of the wire inwardly will produce an effective lengthening of the span between the retaining jaw members, and with the fine wire used in winding 18-pole motors for example, the wire will tend to move off the retaining jaw members. When the reach between successive retaining jaw members is straight, this situation does not obtain.

Numerous variations in the process and apparatus of this invention, within the scope of the appended claims, will occur to those skilled in the art in the light of the foregoing disclosure. Merely by way of example, other means may be used for moving and biasing the various elements that have been described as being moved pneumatically or by the use of springs. Different means for moving the forming tools synchronously can be used, although the scroll plate has the advantage of precision, and has been found to operate excellently. The construction and configuration of winding forms can vary and, for use with different types of dynamo-electric machines, will necessarily vary. If the flexible strip is used to retain wire on the winding form, in which case, a pin or shoulder on the retaining jaw is provided to flex the strip and retract its retaining end, the wire-engaging surface of the winding form can be given a slight draft to facilitate removal of the wire skein. By providing sufficient travel of the spring plunger 59, a circular skein form can be used in the forming of the skein, the skein being converted to polygonal form when the retaining jaws are moved radially outwardly initially against the bias of the spring plunger before the forming tools engage the skein. Winding forms can be made in the form of discs, not hollow cylinders, if they are mounted on rods or studs instead of a cylindrical mandrel, for example. These variations are merely illustrative.

I claim:

1. A method of winding a multi-pole stator comprising forming a skein of a multiplicity of turns of magnet wire; engaging the inner reaches of the skein with retaining jaws spaced from one another; moving forming tools simultaneously inwardly against the outer reach of the skeined wire between said retaining jaws while said retaining jaws move inwardly sufficiently to accommodate the effective shortening of the wire reaches to produce a petalled, serpentine coil form with a series of inwardly directed apices between said retaining jaws; inserting a holding pin between the said outer reach of the wire at each of said apices and the forming tools; retracting said forming tools, and, while said wire is held between said pins and said retaining jaws, loading said formed wire onto a transfer tool.

2. The method of claim 1 including the step of moving said transfer tool axially to position said wire between spaced fingers of said transfer tool.

3. The method of claim 1 wherein the skein is formed polygonally, with a substantially straight reach between successive jaws.

4. The method of claim 1 wherein the skein is formed by winding on a form and is slid therefrom onto retaining jaw members.

5. The method of claim 1 wherein the skein is wound directly on and around retaining jaw members.

6. The method of claim 1 including the step of exerting a relatively strong initial, radially outward bias on the retaining jaws to remove any slack in the skein before the forming tools reach the skein, and then, as the forming tools reach the skein, reducing the said bias to a level to permit the forming tools to form the coils and thereby to move the retaining jaws against said reduced bias.

7. Apparatus for forming coils for a dynamo-electric machine and mounting said coils on a transfer tool, comprising a table having a hole through it; a multiplicity of retaining jaws mounted on said table in spaced relation to one another for movement toward and away from said hole, said jaws being adapted to hold a skein of magnet wire extending from one to another of said jaws; means for biasing said retaining jaws in a direction away from said hole; forming tools mounted on said table between said retaining jaws for movement toward and to an inner position within the compass of a projection of said hole, and away from said inner position to an outer position outboard of reaches of said skein of magnet wire extending between said retaining jaws, each of said tools having a nose portion with a surface defining a recess opening toward said hole; means for moving said forming tools; pin means extending parallel to said recess-defining surfaces of said forming tools and mounted for reciprocating movement through said hole to a position at which they lie within the reach of said recess-defining surface and a second position at which they are clear of said surface, and transfer tool elevating means for reciprocatingly carrying a transfer tool, with fingers, spaced parallel to and outboard of said pins from a position at which said fingers are clear of reaches of a coil of wire held by said pins to a position at which said fingers project through and beyond said reaches of coils retained by said pins.

8. The apparatus of claim 7 including means for selectively limiting the outward movement of said retaining jaws.

9. The apparatus of claim 7 wherein the means for moving the forming tools comprise a scroll plate for moving all of said forming tools synchronously.

10. The apparatus of claim 7 including means for winding a skein of wire in polygonal form with substantially straight reaches between successive retaining jaws.

11. The apparatus of claim 10 wherein the winding means comprise a winder and a plurality of winding forms, said forms each having locating means complementary to locating means on said retaining jaws and at least one wire-engaging surface positioned to permit transfer of said skein from said wire engaging surfaces to a wire-receiving surface of a member of said jaws.

12. The apparatus of claim 11 wherein the said surface of said winding forms has no draft.

13. The apparatus of claim 11 wherein a multiplicity of winding forms is mounted on a mandrel of said winder to form a multiplicity of skeins simultaneously, each of said forms having keying means in the form of keys on one surface and key seats in an opposite surface, said keys and key seats being positioned to mate when said forms are properly oriented, and said winder having means complementary to said keying means for engaging keying means of one of said forms, whereby the winder is directly coupled to one form and the remaining forms are drivingly coupled to one another to said keying means.

14. The apparatus of claim 11 wherein each winding form is provided with a multiplicity of radially outwardly extending projections, spaced from one another, each of said projections having at least one wire-engaging surface, the reaches of wire wound on said winding form between said projections being substantially straight, and said projections being positioned complementarily to the said retaining jaw members onto which the skeined wire is slid.

15. The apparatus of claim 14 wherein each said projection has a pair of spaced rounded pilasters comprising the wire-engaging surface, said pilasters having no draft.

16. The apparatus of claim 14 wherein each said projection has key means complementary to key means of the projections of other winding forms.

17. The apparatus of claim 14 wherein each said projection has a radially outwardly extending stud.

18. The apparatus of claim 7 including means for winding a skein of wire, comprising a winding form having keying means on the form of keys on one surface and key seats in an opposite surface, said keys and key seats being positioned to mate when a plurality of said forms are properly oriented, said forms being nestably stackable when loaded with wire.

* * * * *

UNITED STATES PATENT AND TRADEMARK OFFICE
CERTIFICATE OF CORRECTION

PATENT NO. : 4,357,968
DATED : November 9, 1982
INVENTOR(S) : Kieffer

It is certified that error appears in the above—identified patent and that said Letters Patent is hereby corrected as shown below:

Column 1, line 14, "100 watts at 100 v.", should read "100 watts at 110 v."

Signed and Sealed this

Twenty-ninth Day of March 1983

[SEAL]

Attest:

GERALD J. MOSSINGHOFF

Attesting Officer

Commissioner of Patents and Trademarks